US009438426B2

(12) United States Patent
Li et al.

(10) Patent No.: US 9,438,426 B2
(45) Date of Patent: Sep. 6, 2016

(54) KEY-VALUE DATA STORAGE DEVICE WITH HYBRID ARCHITECTURE

(71) Applicant: Seagate Technology LLC, Cupertino, CA (US)

(72) Inventors: Peng Li, Lauderlade, MN (US); Frank R. Dropps, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 39 days.

(21) Appl. No.: 14/506,272

(22) Filed: Oct. 3, 2014

(65) Prior Publication Data

US 2016/0099810 A1 Apr. 7, 2016

(51) Int. Cl.
- *H04L 9/32* (2006.01)
- *G11C 14/00* (2006.01)
- *G06F 12/02* (2006.01)
- *G11C 13/00* (2006.01)

(52) U.S. Cl.
CPC ......... *H04L 9/3242* (2013.01); *G06F 12/0246* (2013.01); *G11C 14/009* (2013.01); *G11C 13/0002* (2013.01)

(58) Field of Classification Search
CPC . G06F 21/72; G06F 12/0246; H04L 9/3242; G11C 14/009; G11C 13/0002
USPC ................................................. 713/193, 192
See application file for complete search history.

(56) References Cited

U.S. PATENT DOCUMENTS

| 7,903,819 | B2 | 3/2011 | Gupta |
| 8,433,695 | B2 | 4/2013 | Wu et al. |
| 8,634,247 | B1 | 1/2014 | Sprouse et al. |
| 8,700,683 | B2 * | 4/2014 | Cooney ............. G06F 17/30126 707/812 |
| 2010/0083004 | A1 * | 4/2010 | Kirshenbaum ..... G06F 21/6218 713/193 |
| 2010/0321183 | A1 | 12/2010 | Donovan et al. |
| 2012/0310882 | A1 | 12/2012 | Werner et al. |
| 2013/0024599 | A1 | 1/2013 | Huang et al. |

* cited by examiner

*Primary Examiner* — Kambiz Zand
*Assistant Examiner* — Aubrey Wyszynski
(74) *Attorney, Agent, or Firm* — Hall Estill Attorneys at Law

(57) ABSTRACT

A key-value storage device and method of using the same. In some embodiments, keys are stored in a key store in a first non-volatile memory and corresponding values associated with the keys are stored in a value store of a second non-volatile memory. An input command is received from a host device, the input command having a key associated with a value. Different first and second hash values are generated by applying a hash function to the key. The input command is executed responsive to the first and second hash values.

20 Claims, 9 Drawing Sheets

KEY-VALUE DATA STORAGE DEVICE WITH HYBRID ARCHITECTURE

SUMMARY

Various embodiments of the present invention are generally directed to a key-value data storage device and a method of operation thereof.

In some embodiments, keys are stored in a key store in a first non-volatile memory and corresponding values associated with the keys are stored in a value store of a second non-volatile memory. An input command is received from a host device, the input command having a key associated with a value. Different first and second hash values are generated by applying a hash function to the key. The input command is executed responsive to the first and second hash values.

In other embodiments, a key-value storage device has a key store in a first non-volatile memory module and a value store in a second non-volatile memory module. The value store comprises a plurality of data blocks, each data block storing a fixed amount of user data. The key store comprises a plurality of keys and physical addresses of the data blocks in the value store. A command processing module is configured to receive an input command to transfer data between the storage device and a host device, the input command having a key, the command processing module further configured to generate different first and second hash values by applying a hash function to the key, and to execute the input command responsive to the first and second hash values.

In other embodiments, a key-value storage device has a first non-volatile memory module which stores a key store and a second non-volatile memory module which stores a value store. The value store comprises a plurality of data blocks each storing an amount of user data, and the key store comprises a plurality of keys and physical addresses of the data blocks in the value store associated with the keys. A host interface module is adapted to receive an input command from a host device coupled to the key value storage device, the input command having an associated key. A hash function module is adapted to generate different first and second hash values by applying a cryptographic hash function to the associated key. A local memory module stores a hash table and a key linked list, the hash table comprising a plurality of entries each comprising to a different possible value of the first hash value and a corresponding possible value of the second hash value, the key linked list comprising a plurality of entries linked to the entries of the hash table and having additional possible values of the second hash value. A control circuit is adapted to use the first hash value generated by the hash function module to index the hash table to locate a first matching entry, to evaluate the located matching entry and one or more of the key linked list entries to locate a second matching entry that matches the second hash value generated by the hash function module, to access the key store and retrieve a copy of the associated key from a location identified by the second matching entry, and to execute the input command to transfer data between the key value storage device and the host device responsive to a match between the retrieved copy of the associated key and the received associated key from the received command.

These and other features and advantages which characterize various embodiments of the present disclosure can be understood in view of the following detailed discussion and the accompanying drawings.

DETAILED DESCRIPTION

Figure 1:
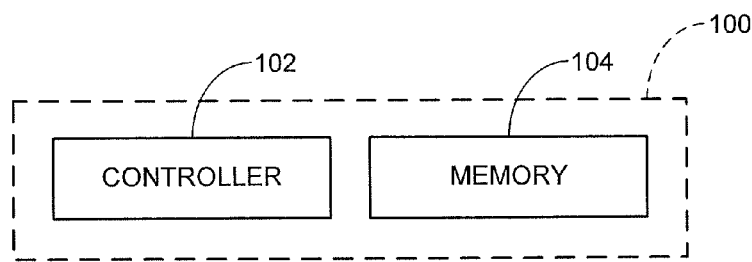
FIG. 1 provides a functional block representation of an exemplary data storage device in accordance with various embodiments of the present disclosure.

The present disclosure generally relates to data storage, and more particularly to a method and apparatus for storing data in a data storage device using a key-value storage scheme.

Key-value storage devices use multi-bit input keys to identify data blocks for storage by the storage device. The bit sequence of a given key is normally independent of logical or physical addressing associated with the corresponding data block. Key-value storage schemes have been found to be particularly useful in distributed object storage, cloud computing and RAID environments where multiple data storage devices are combined to provide a large memory space.

Key-value storage devices are configured to receive input commands from a host device to carry out various access (e.g., read or write) operations. A typical command includes at least one key associated with the data blocks that are associated with the command. In some cases, a key-value storage device may map the key to a logical address (e.g., LBA), and then map the logical address to a physical address (e.g., PBA, sector) in a main memory of the storage device. While operable, the mapping of key-to-LBA and LBA-to-PBA can provide a performance bottleneck, particularly if multiple main memory accesses are required to locate the data associated with a given command.

Accordingly, various embodiments of the present disclosure are generally directed to a key-value storage scheme that addresses these and other limitations of the current art. As explained below, a data storage device includes first and second non-volatile memory modules. The first and second memory modules may be different types of memory, such as solid-state memory (e.g., solid-state drive, SSD memory) and rotatable media (e.g., hard disc drive, HDD memory), respectively. This is not necessarily limiting, however, since the first and second memory modules may share a common type of construction, such as both being formed of solid-state memory.

The first memory module is used as a key store and the second memory module is used as a value (user data) store. This provides a multi-tiered data storage device structure that provides fast key processing with reliable verification capabilities, low latency and high throughput.

The key store is a data structure that generally operates to store copies of all of the various key values used by the system. The data store is a data structure that generally operates to stores the user data blocks associated with the keys. Other data structures may include a hash table, a key linked list and one or more storage tracking tables. These latter data structures may be maintained in a local memory, such as a volatile dynamic random access memory (DRAM).

As explained below, various embodiments process a received command using a hash function block. The hash function block generates different first and second hash values based on an input key associated with the command. The first hash value is used as an index into the hash table to identify a corresponding entry in the table.

A first comparison operation (sequence) is carried out to match the second hash value derived from the hash function block to a copy of the second hash value in the located entry of the hash table, or to a copy of the second hash value in one or more entries in the key linked list that are linked to the located entry of the hash table. Once a match is found, the key store in the first memory module is accessed to retrieve a copy of the key. A second comparison operation (sequence) is carried out to ensure the input key matches the key retrieved from the key store. If a match is found, the access command is identified as an approved command, and the approved command is scheduled for execution to service a data transfer operation with the value store.

In this way, the various performance advantages of key value storage can be implemented in a storage device without the performance bottlenecks often experienced by current generation systems.

These and other features and considerations will be discussed beginning with a review of FIG. 1 which generally illustrates an exemplary data storage device 100. The device 100 includes a controller 102 and a memory module 104. The controller 102 provides top level control for the device 100 and may be configured as a programmable processor with associated programming in local memory.

The memory module 104 can be arranged as one or more non-volatile memory elements such as rotatable recording media (discs) and solid-state memory arrays. While a separate controller 102 is shown in FIG. 1, such is unnecessary as alternative embodiments may incorporate any requisite controller functions directly into the memory module.

The memory module 104 serves as a main store for user data from a host device. The host device can be any device that communicates with the storage device 100. For example and not by way of limitation, the storage device may be physically incorporated into the host device, or the host device may communicate with the host device via a network using any suitable protocol. In some embodiments, the storage device 100 is configured to form a portion of a multi-device storage enclosure in a mass storage environment such as a distributed object storage system, a cloud-based computing environment, a RAID (redundant array of independent disks) system, etc.

Figure 2:
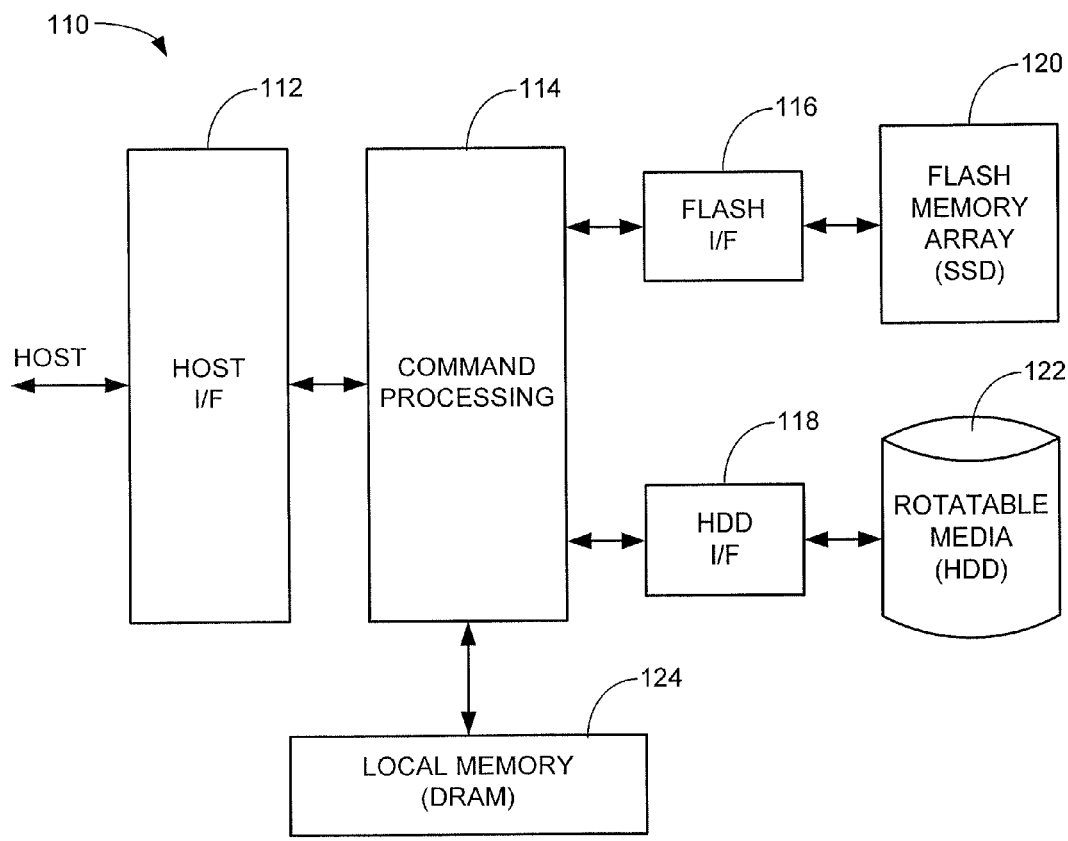
FIG. 2 shows the data storage device of FIG. 1 in accordance with some embodiments.

FIG. 2 is a functional block representation of a data storage device 110 in accordance with some embodiments. The device 110 generally corresponds to the device 100 and is characterized as a hybrid data storage device having different forms of non-volatile memory, which in this case are flash memory and rotatable memory (magnetic recording media), respectively. Other configurations are contemplated including non-hybrid arrangements.

The device 110 includes a host interface (I/F) module 112 that interfaces with one or more host devices (not shown). The host I/F 112 receives and forwards commands to a command processing module 114. The command processing module 114 communicates with a flash interface (I/F) module 116 and a hard disc drive (HDD) I/F module 118.

The flash I/F module 116 provides write, read and erasure functionality for a flash memory array 120. The flash memory array 120 is configured as a solid-state drive (SSD) non-volatile memory module with programmable non-volatile flash memory cells. The HDD I/F module 118 provides write and read functionality for a rotatable media module 122. The rotatable media module is configured as an HDD non-volatile memory module having one or more rotatable data recording media (discs). The command processing module 114 further communicates with a local memory 124, such as in the form of volatile dynamic random access memory (DRAM) memory.

While not necessarily limiting, it is contemplated that the various operational modules of the data storage device 110 of FIG. 2 are housed within a single data storage housing having a selected form factor so that the data storage device 110 is a single portable unit that can be incorporated into a larger multi-device data handling system, such as but not limited to a JBOD (just a box of drives) data storage enclosure of a mass data storage system. In some cases, the device 110 has a 3½ inch form factor with nominal length and width dimensions of about 146 millimeters, mm by about 101.6 mm. In other cases, the device has a 2½ inch form factor with nominal length and width dimensions of about 100 mm by about 73 mm. Other sizes and formats can be used.

Flash memory is provided as the exemplary solid-state memory of the array 120. Other forms of solid-state non-volatile memory can be used including but not limited to spin transfer random access memory (STRAM), resistive random access memory (RRAM), phase change random access memory (PCRAM), etc. Similarly, rotatable magnetic recording media are used in the HDD module, but other forms of rotatable media including optical media, magneto-optical media, etc can be used as desired.

Figure 3:
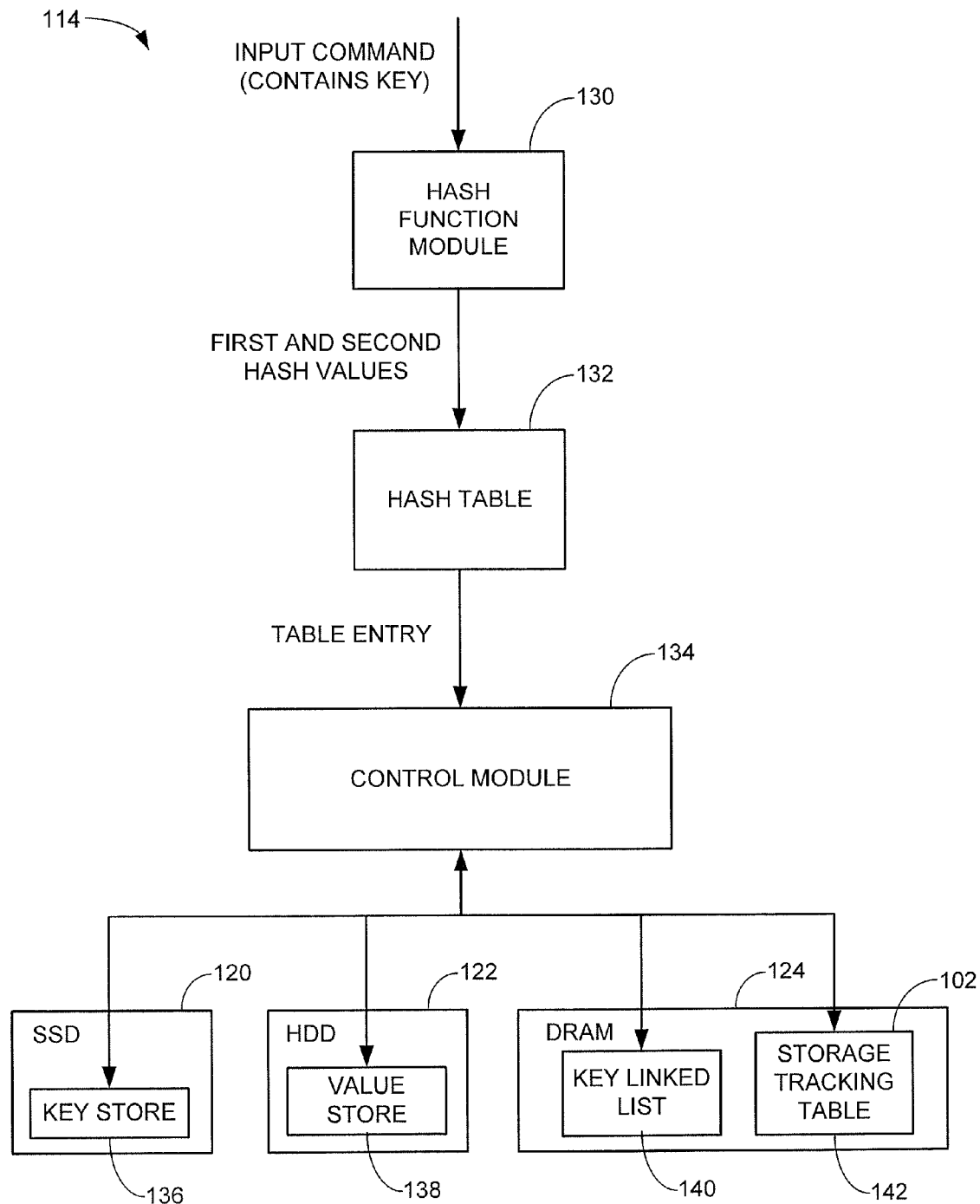
FIG. 3 is a functional block representation of operation of the device of FIG. 2.

FIG. 3 shows relevant operations of the command processing module 114 of FIG. 2. A received command from a selected host device includes a key comprising a multi-bit sequence of selected length. To provide an illustrative example, it will be contemplated that each key is 4 kilobytes, KB (4,096 bytes) in length. Other lengths and formats can be used.

The key is extracted from the received command and supplied to a hash function module 130. The hash function module 130 is configured to perform one or more hash function (such as cryptographic hash function) operations upon the input key to generate a first hash value and a second hash value.

While not limiting, it is contemplated that the first and second hash values from the hash function module 130 will be multi-bit cryptographically generated sequences that are significantly shorter in length as compared to the overall length of the input key. The length of each of the respective first and second hash values can be any suitable value including but not limited to 32 bits (4 B), 64 bits (8 B), 128 bits (16 B), etc. The first and second hash values may each be the same length, or may be different lengths.

The hash function(s) used to generate the first and second hash values can take a variety of forms. The hash functions can be in the form of secure hash algorithms (SHA) published by the National Institute of Standards and Technology (NIST). For example, a SHA-2, a SHA-256, a SHA-384, and/or a SHA-512 algorithm may be applied to generate the respective first and second hash values.

The hash function(s) can be one or more selected functions from a universal family of hash functions. As will be recognized by those skilled in the art, a family of hash functions can be classified as universal if, for every unique hash function in the family, the probability of the output of that hash function for a first input being equal to the output of another hash function for a second input is less than a defined mathematical constraint. A variety of universal hash functions are known in the art and can be used to generate the first and second hash values. A multi-bit selection value can be used to select the individual hash functions from the universal family.

The hash function(s) can be CRC (cyclical redundancy checking) encryption mode based encryption functions or some other forms of cryptographic functions that takes an input and modify the same in accordance with a selected cryptographic transfer operation to provide a selected output. The hash functions can use any number of keys, tweak values, seeds, combinatorial functions, etc. as part of the hash function algorithms. Deterministic random number generator (DRNG) circuitry and the like can be used as part of the hash generation process. Multi-stage hash functions can further be used so that, for example, a first hashing algorithm is applied to generate an initial value and a second algorithm is applied to generate a final value. Any number of stages can be used as desired.

The same hash function can be used to generate both of the first and second hash values. For example, in one embodiment a selected hash function is used to generate the first hash value using the received key as an input. A processing operation is applied to the input key to form a modified key. The modified key is applied to the same selected hash function to generate the second hash function. In another embodiment, a selected hash function is used to generate the first hash value using the received key as an input. The first hash value is subjected to processing such as using a combinatorial logic function to generate the second hash value.

Regardless of form, the hash processing by module 130 will be repeatable such that the same first and second hash values will be generated each time the same input key is received by the module. Moreover, it is contemplated that the first and second hash values, in combination, can reduce the probability of the hash collision significantly.

Depending upon the hashing scheme, it is anticipated that multiple different input keys may hash to the same first hash value. The hashing algorithm is selected such that the probability of collision using both the first hash value and the second hash value is extremely low and, for all intents and purposes, will be practically zero.

For purposes of clarity, the hash function module 130 will be understood as performing first and second hash functions to generate the first and second hash values, regardless whether the first and second hash functions use different hashing algorithms, or whether the first and second hash functions apply the same hashing algorithm to different input data (or to the same data through the use of different tweaks, seeds, etc.).

Once the first and second hash values are generated by the module 130, the first hash value is applied as an index into a hash table 132. The hash table 132 includes a number of entries, with each entry including a number of data fields discussed below that enable the control processing module to ultimately locate the data block(s) corresponding to the input command. The hash table 132 can be located in any suitable memory location, such as by being loaded to the local memory 124 (FIG. 2) during system initialization.

Table entries from the hash table 132 are supplied to a control module 134. The control module 134 uses the contents of the received table entries to access a number of data structures resident in the flash (SSD) memory 120, rotatable media (HDD) memory 122, and local (DRAM) memory 124. These data structures include a key store 136 in the SSD memory 120, a value (user data) store 138 in the HDD memory 122, and a key linked list 140 and a storage tracking table 142 in the DRAM 124. Exemplary formats of each of these data structures will be discussed in turn below.

Figure 4:
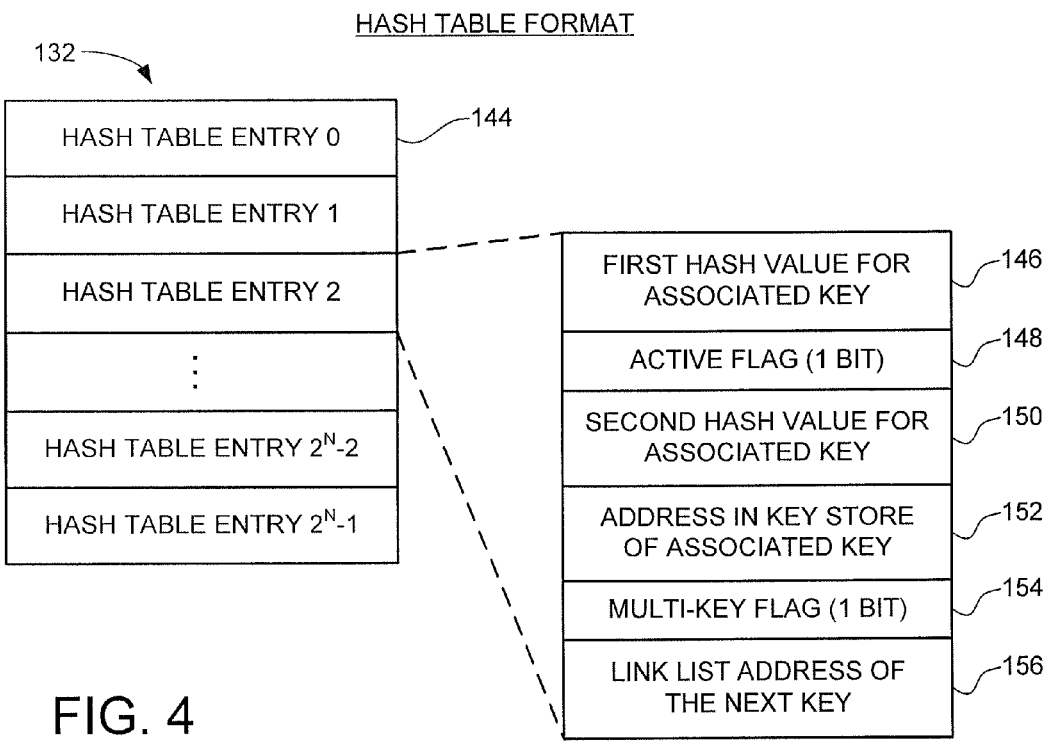
FIG. 4 shows an exemplary hash table format.

FIG. 4 shows an exemplary format for the hash table 132 of FIG. 3. It is contemplated that the hash table will have a total of $2^N$ entries 144 (from entry 0 to entry $2^N$-1) for a first hash value length of N-bits. For example, if the first hash value is 28 bits in length, the hash table 132 will have a total of $2^{28}$ entries. Other arrangements can be used. It will be understood that using a larger first hash value (e.g., 64 bits, 128 bits, etc.) will tend to produce fewer collisions but will also increase the overall size of the hash table.

Each entry 144 in the hash table 132 includes a number of fields including a first hash value field 146, an active flag 148, a second hash value field 150, a key store address field 152, a multi-key flag 154, and a link list address field 156. The various fields can be provided in any suitable order, and other fields can be used as required.

The field 146 stores all $2^N$ combinations of the N-bit first hash values, so that each entry 144 has a different N-bit value in the field 146. The hash table 132 is accessed to locate the entry 144 having the N-bit value in field 146 that matches the input first hash value from the hash function module 130. The entries can be arranged and sorted to improve searching efficiencies.

The active flag 148 is a single bit field that stores a logical value that indicates that at least one key in the system is hashed to this entry. A bit value of logical 0 can be used to indicate that the key is not used by the system (e.g., inactive), and a bit value of logical 1 can be used to indicate that the key is used by the system (e.g., active). The active flag 148 provides a quick and easy way to immediately reject matching entries from the hash table 132 for which data are not stored in the system.

The second hash value fields 150 store copies of the second hash values generated by the system. Because different input keys may map to the same first hash value, the second hash value provides a second level of verification processing. For a given active entry 144 found to match a particular first hash value, the system proceeds to compare the second hash value with the contents of the field 150. This provides fast reject processing by eliminating the need for flash access to carry out a key comparison at this point if the second hash values do not match.

The key store address field 152 provides a specific NAND flash address in the flash array 120. The flash address stores a copy of the key corresponding to the first hash value in field 146 and the second hash value in field 150. The multi-key flag 154 indicates that more than one key has the same first hash value. The next key flash address is stored in the key linked list 140. The link list address field 156 provides a pointer to the address or position in the key linked list for the next key. All of the keys that share the same first hash value but have different second hash values are linked via the key linked list.

Figure 5:
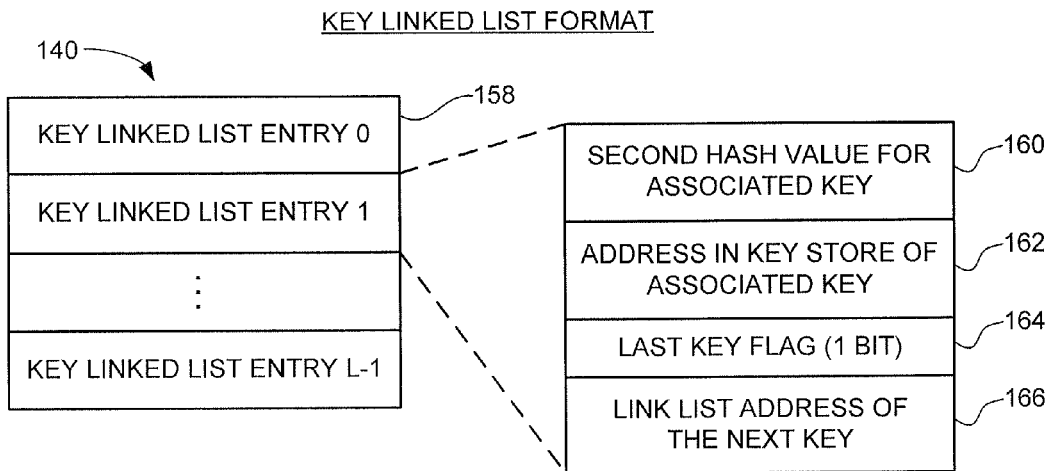
FIG. 5 shows an exemplary key linked list format.

FIG. 5 is an exemplary format for the key linked list 140. Other formats can be used as desired. As noted above, the key linked list 140 provides additional entries for a given first hash value that have different second hash values. The key linked list 140 enhances processing efficiency by enabling searches to take place via DRAM or the other local memory 124 that will have faster access times than the flash array 120. The DRAM access times can be masked by the longer access times as keys are read from flash. Moreover, maintaining the key linked list in volatile memory can allow real time updates as entries are added or removed from the system. The linked list can be sorted to change the order and improve searching efficiencies.

The key linked list 140 includes a plural number L of entries 158 listed from 0 to L-1. Each entry 158 includes a number of fields including a key store address field 160, a second hash value field 162, a last key flag 164 and a link list address field 166.

The key store address field 160 stores the physical address in the NAND flash memory 120 at which the corresponding key is stored. The second hash value field 162 provides a copy of the second hash value to enable quick comparison operations during verification processing. The last key flag 164 signifies the current entry is the last entry in the sequence (last key). The link list address field 166 points to the location in the linked list of the next key if the current entry is not the last key.

Figure 6:
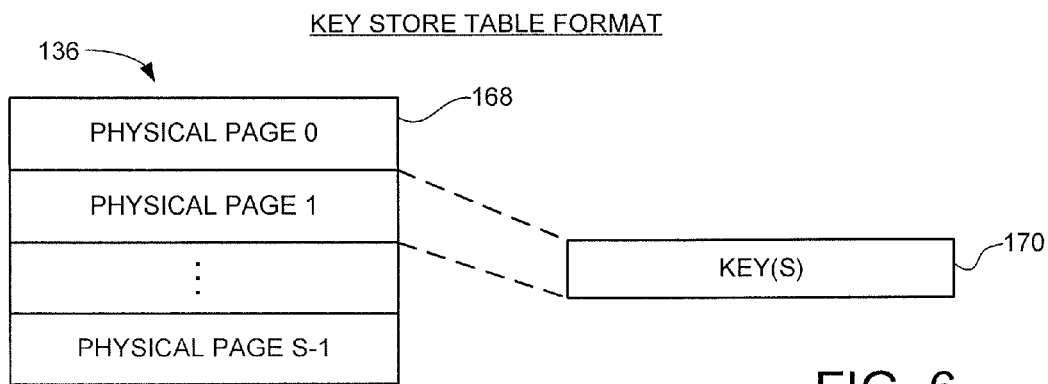
FIG. 6 shows an exemplary key store table format.

An exemplary format for the key store 136 is provided in FIG. 6. The key store 136 is a data structure maintained in the flash memory 120 (see FIGS. 2-3) and used to store copies of the various keys used by the system. It is contemplated that a total of S pages (blocks) 168 of memory are used for storage of the respective keys (pages 0 to S-1). Each page 168 stores a copy of a different one of the keys 170 used by the device 110.

Other data may be stored within the flash memory 120 as desired, including control data (metadata) loaded into the local memory 124 (e.g., hash table 132, key linked list 140, tracking tables 142). While it is contemplated that the user data blocks (value store) will reside in the rotatable media 122 (FIGS. 2-3), in other embodiments some or all of the user data blocks are stored in the flash memory 120 (or other solid-state memory) of the device 110, either as a redundant copy or as the main store location for the data. In some cases, hot data (e.g., user data having a relatively high access rate over a given time interval) may be migrated to the flash memory 120, and the locations of the data will be updated in the system data structures.

Figure 7:
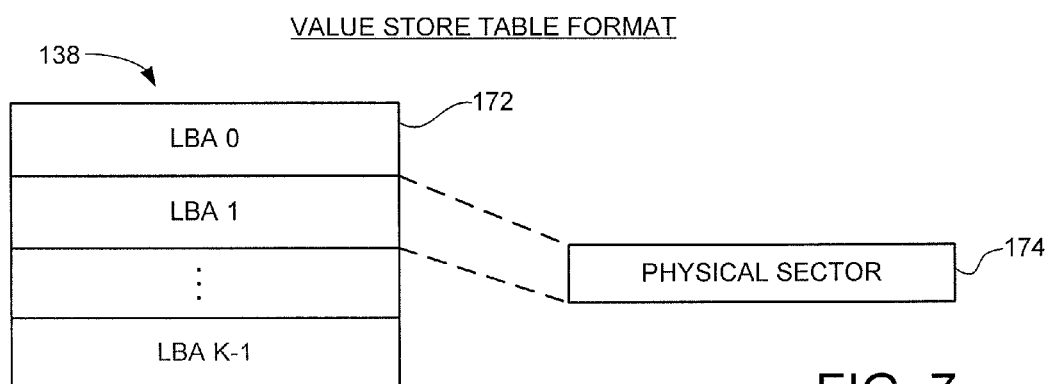
FIG. 7 shows an exemplary value store table format.

An exemplary format for the value store 138 is shown in FIG. 7. The data are arranged in the form of logical block addresses (LBAs) which in turn are mapped to physical block addresses (PBAs or sectors) on the rotatable media. Each data block in the system has a corresponding logical and physical address. A total of K LBAs are supported by the system. Accordingly, the value store 138 includes entries 172 for LBAs 0 to K-1, with each entry mapped to a corresponding physical sector 174 on the media at which the data block is stored.

Figure 8:
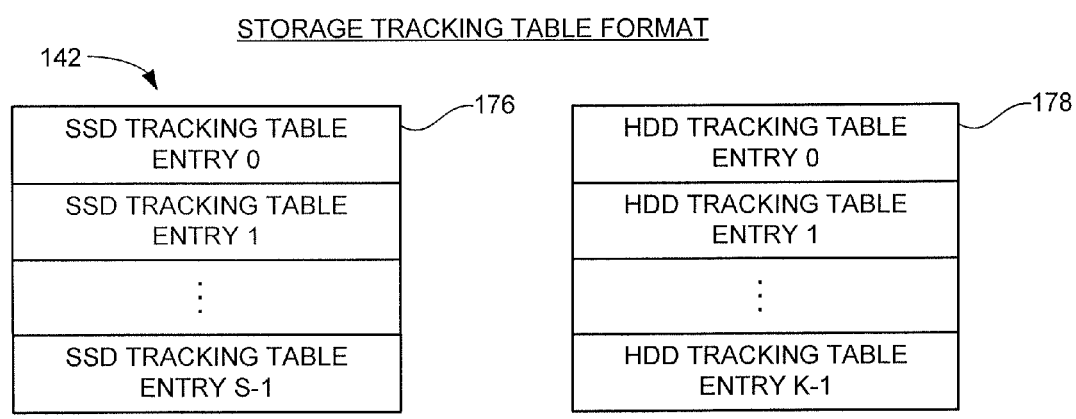
FIG. 8 shows an exemplary storage tracking table format.

Exemplary format for the tracking tables 142 from FIG. 3 are shown in FIG. 8. One tracking table is supplied for each form of memory (e.g., flash, disc, etc.). Entries 176 provide tracking information for each of the S pages 168 in the flash memory 120 used in the key store 136, and entries 178 provide tracking information for each of the K sectors 174 in the rotatable memory 122 used in the value store 138.

The particular formats for the entries 176, 178 will vary depending on the requirements of a given application. Generally, the entries are configured to track the status of each page and sector. In some cases, each entry may include a single bit status flag to indicate if the data in the corresponding location are valid. In this way, key updates or deletions can be handled by marking the status in the tracking table 142. The storage tracking tables 142 can be used during garbage collection operations as sections of memory are erased and reallocated for use.

Figure 9:
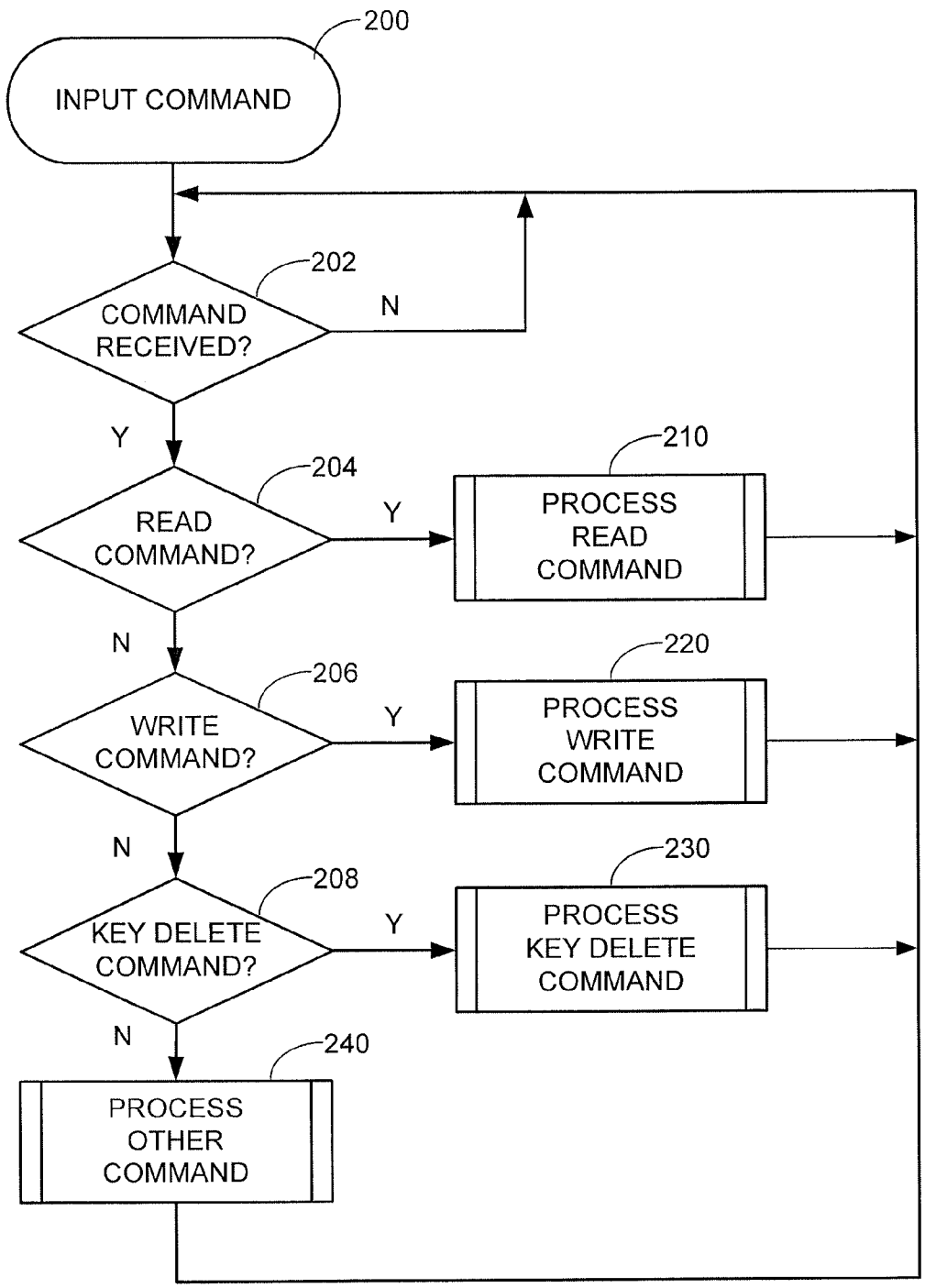
FIG. 9 is a flow chart for an input command processing routine.

FIG. 9 provides a top level flow chart for a command processing routine 200 to illustrate overall operation of the storage device 110 in accordance with various embodiments. Individual processing routines set forth in FIG. 9 will be discussed in detail below.

The routine 200 includes a monitoring operation at decision step 202 to determine if an input command has been received. If so, the routine evaluates the command via decision steps 204, 206 and 208. A read command is processed via routine 210; a write command is processed via routine 220; a key delete command is processed via routine 230; and other commands may be processed at 240. It is contemplated that multiple commands may be concurrently pending in the system, in which case the device 110 establishes a command queue and processes the pending commands in a suitable order to expedite efficiency and data throughput.

Figure 10:
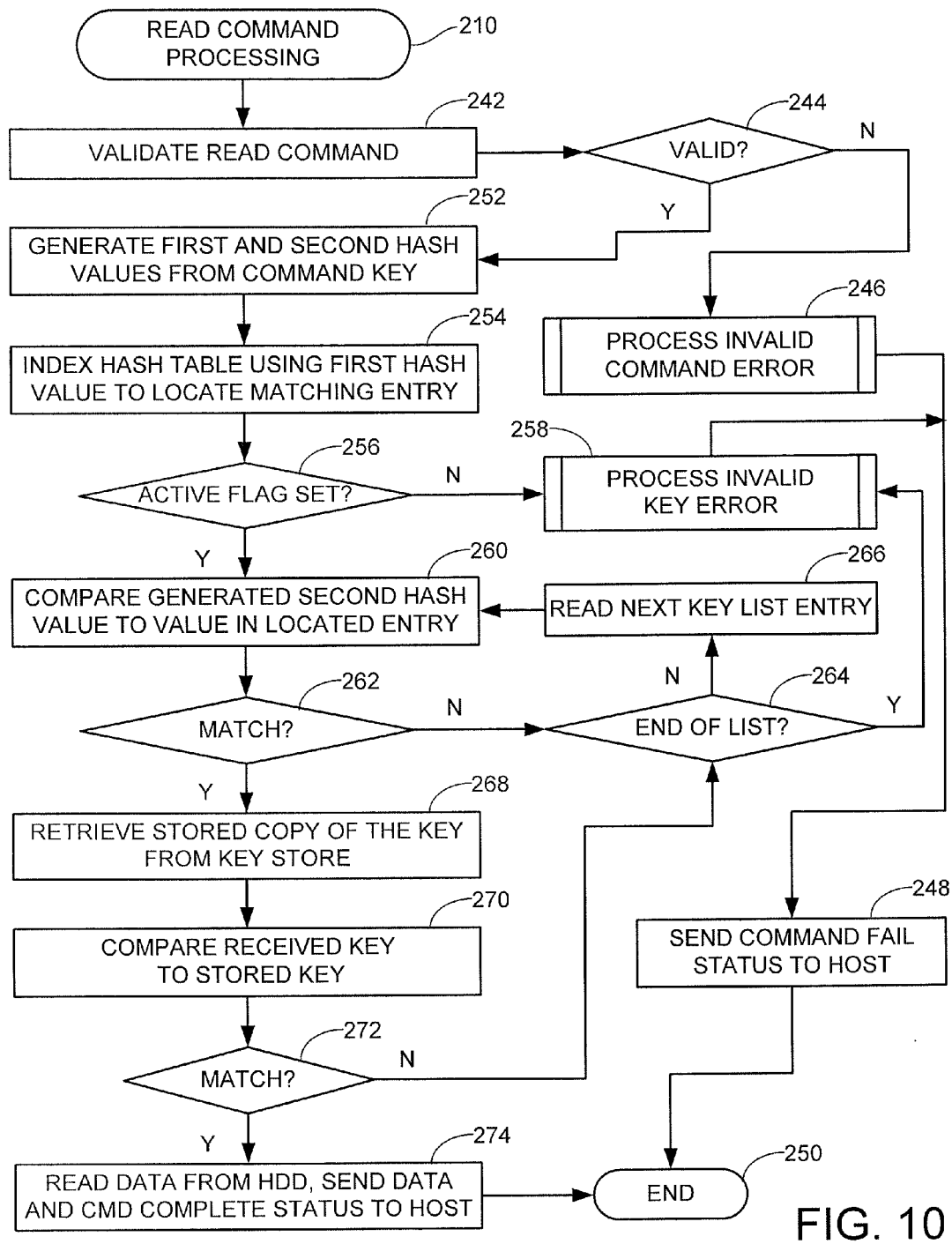
FIG. 10 is a flow chart for a read command processing routine.

FIG. 10 shows the read command processing routine 210 from FIG. 9. The steps shown in FIG. 10 are merely exemplary and may be omitted, modified, appended and/or performed in a different order. It is contemplated that the read commands processed by FIG. 10 will be key-value commands received from a host device to request one or more data blocks identified by one or more keys provided as part of the read command.

A received read command is initially validated at step 242. Validation can include various operations to ensure the command is complete and in the proper form, is from an authorized host device, etc. If the command is found to be an invalid command, decision step 244, the flow passes to processing routine 246 where an error condition is declared and processed based on an invalid command. A command fail status is forwarded to the host, step 248, and the routine ends at step 250. The basis for the error condition is an invalid command.

If the command is determined to be valid, the flow passes to step 252 where first and second hash values are generated from the key associated with the input command. As discussed above, this is carried out using the hash function module 130 of FIG. 3. The first and second hash values will be different and will (in combination) reduce the probability of hash collision significantly.

The hash table 132 is indexed at step 254 using the first hash value. This locates the corresponding entry 144 in the hash table for which the contents of field 146 match the input first hash value (see FIG. 4). The active flag 148 for the located entry 144 is evaluated at decision step 256. If the active flag bit indicates an inactive status, the flow passes to processing routine 258 where an invalid key error is declared and serviced. A command fail status is sent to the host at step 248. The basis for this error is that a read request has been issued for data not recognized as active by the system.

If the active flag bit indicates active status, the flow passes to step 260 where the contents of field 150 (see FIG. 4) are retrieved from the located entry and compared to the input second hash value. If a mismatch occurs, decision step 262, the system accesses the key linked list 140 using the address in field 156 of the located entry 144. If the address points to a valid entry 158 in the linked list 140 (see FIG. 5), the valid entry is evaluated by comparing the contents of field 162 in the linked list entry to the input second hash value. This sequence is represented in FIG. 10 by steps 264, 266 and 260 and continues until either a match is found or all linked entries are exhausted.

Upon a match between the data in the hash table 132 or the key linked list 140 and the data making up the input second hash value, the flow continues from decision step 262 to step 268 where a copy of the key is retrieved from the key store 136 in the flash memory 120. This copy is identified using the NAND address information in either field 152 (FIG. 4) or field 162 (FIG. 5), respectively, based upon which entry provided the match for the second hash value. It will be noted that, to this point in the current embodiment, all memory accesses have taken place using the volatile local memory 124 (e.g., DRAM) and no flash memory accesses have been required.

The retrieved copy of the key is compared to the originally received key associated with the processed read command at step 270. If a match is found, decision step 272, the flow passes to step 274 where the associated read data block(s) are recovered from memory (e.g., the rotatable HDD memory 122) and forwarded to the host along with a command complete status. The read data may be transferred to a buffer memory of the host I/F 112 (FIG. 2) pending transfer to the host device.

In the event that a mismatch occurs between the retrieved key and the input key, the routine passes from decision step 272 back to step 264 for the evaluation of additional entries (if any) in the key linked list.

In some embodiments, the read commands of step 274 may be placed into a queue of approved commands which are then executed in a suitable order based on transducer position, data rotational position, priority or other factors. Similarly, multiple input read commands can be processed by the routine of FIG. 10 during various latency periods such as during the access time required to retrieve data from the flash memory 120 and/or the rotatable memory 122.

The execution of the read commands upon the key store 136 in the flash memory 120 and upon the value store 138 in the rotatable memory 122 are carried out in a straightforward manner using the respective flash I/F 116 and HDD I/F 118 (FIG. 2).

Reading the flash memory 120 can include various steps of scheduling the read operation, applying one or more read voltage thresholds to the flash cells to recover the associated data, the application of error detection and correction (EDC) processing, decryption, data authentication using message digest values, run length limited (RLL) decoding, etc. Reading the rotatable memory can similarly include various steps of scheduling the read operation, performing a seek operation to move a data transducer to an associated track on which the data block(s) are located, recovering a readback signal therefrom, and applying similar EDC, authentication, decryption, RLL decoding, etc.

Figure 11:
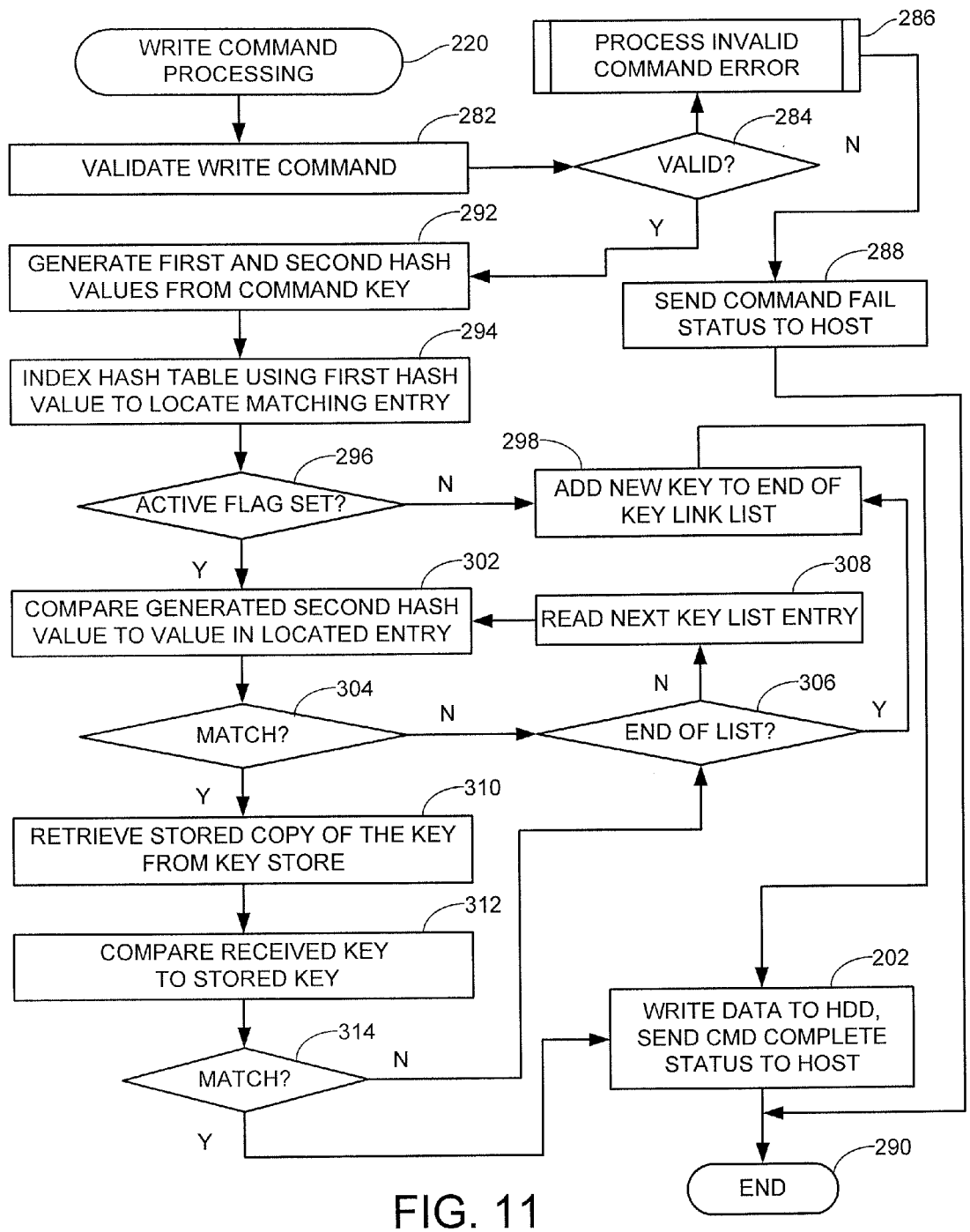
FIG. 11 is a flow chart for a write command processing routine.

FIG. 11 sets forth a flow chart for the write command processing routine 220 of FIG. 9. As before, the various steps in FIG. 11 are merely exemplary. Some processing steps in FIG. 11 are similar to those set forth in FIG. 10, but there are some differences due to the fact that servicing a keyed write command generally involves the transfer of user data to be written to the main memory store (e.g., rotatable memory 122) and, as necessary, the building or updating of data structures to reflect the location and status of the new data.

In some cases, such as but not limited to a RAID environment, a write operation may involve one or more read operations, as well as one or more additional write operations. For example, updating a particular RAID stipe may include reading the entire RAID set (including parity data sets as required), performing verification operations, and writing the new updated data as well as new parity data to the system. Accordingly, the various steps in FIGS. 10 and 11 can be combined and used as required to service a given write command.

Validation of a received write command is carried out at step 282. As before, such validation can include ensuring the command is complete, in a proper form, includes associated write data which may be temporarily stored in buffer memory, etc. Upon a validation failure, decision step 284, the flow passes to an error processing routine 286 and a command fail status is forwarded to the host at step 288, after which the routine ends at step 290.

A validated write command is next processed at step 292 by generating first and second hash values based on the key of the write command. At step 294, the first hash value is used to index the hash table 132 to locate the corresponding entry 144 that stores the first hash value (field 146, FIG. 4). The status of the active flag 148 is next determined at step 296.

If the flag is not active, this generally signifies that data associated with the input key have not been previously presented to the device 110 for storage. Accordingly, a new entry 158 is appended to the end of the key link list 140 for the input key at step 298. The new entry is populated as shown in FIG. 5, including the storage of the NAND address of the key in the key store, the storage of the calculated second hash value, and the setting of the last key flag.

The input write data are thereafter written to the rotatable memory and a command complete status is forwarded to the host, as indicated by step 300. As before, the write command may be placed into an approved command queue so that the data are scheduled for writing in accordance with a command sequence scheme that enhances data throughput.

Writeback caching techniques can be used so that the device 110 immediately conveys the command complete status to the host device at this point, maintains the write data in a local buffer, and schedules the writing of the data at a later time. Generally, it is contemplated that a command complete status will not be sent until the verification processing of the routine of FIG. 11 has been completed to ensure an error condition is not declared. Other variations can be used, however.

For reference, it will be noted at this point that some aspects of the system are prepopulated prior to the storage of user data, such as the first hash values and addresses in the hash table 132 and the keys in the key store 138. Other values in the system, such as the key linked list entries, status flags, etc., are generated and/or updated during subsequent access operations.

Returning to decision step 296, if the active flag bit is set, this signifies that a prior version of the data blocks has been previously written to the system. Further verification is therefore performed in order to ensure the data are written to the appropriate location and the various control data structures are correctly updated.

Rotatable memory such as 122, as well as other rewritable memory such as STRAM, RRAM, PCRAM, etc., generally enable updated data to be directly overwritten onto a previous version of the data in an existing memory location. Thus, the pointers to the physical addresses for the newly written data may not need to be changed.

Erasable memory, such as flash, generally require new versions of data to be written to a new, available location and older versions of the data be marked stale. This will generally require the pointers to the physical addresses for the newly written data to be changed, and the older data to be marked stale. This can be accomplished by updating the respective value store and key store tables 136, 138 (FIGS. 6-7) and the storage tracking tables 142 (FIG. 8).

The process flow passes from decision step 296 to step 302 where the second hash value for the input key is compared to the corresponding value in field 146 of the hash table entry 144. If a mismatch occurs, the key linked list 140 is accessed and successive entries are evaluated as before, as indicated by steps 306 and 308. However, if a match is not ultimately located, instead of declaring a read error as in the routine of FIG. 10, in FIG. 11 the flow passes back to step 298 where a new entry is appended to the key link list and the system proceeds to schedule the writing of the data.

If and when a match is made between the respective copies of the second hash value, the flow continues from decision step 304 to step 310 where a read access operation is scheduled and performed to retrieve the associated key from the key store 136. The retrieved copy of the key is compared to the input key at step 312. A match results in the scheduling of the write command, while a mismatch initiates a new search through the keyed link list (decision step 314).

As before, the verification processing using the first and second hash values can be carried out using the fast local memory 124 (e.g., DRAM), thereby eliminating the need for accesses to either the key store 136 or the value store 138 until both hash values have been matched. Moreover, it will be noted that the embodiment of FIG. 11 does not require an access to the key store 136 for writes involving previously unused keys. Such comparison can be carried out, however, to provide an additional layer of verification.

Figure 12:
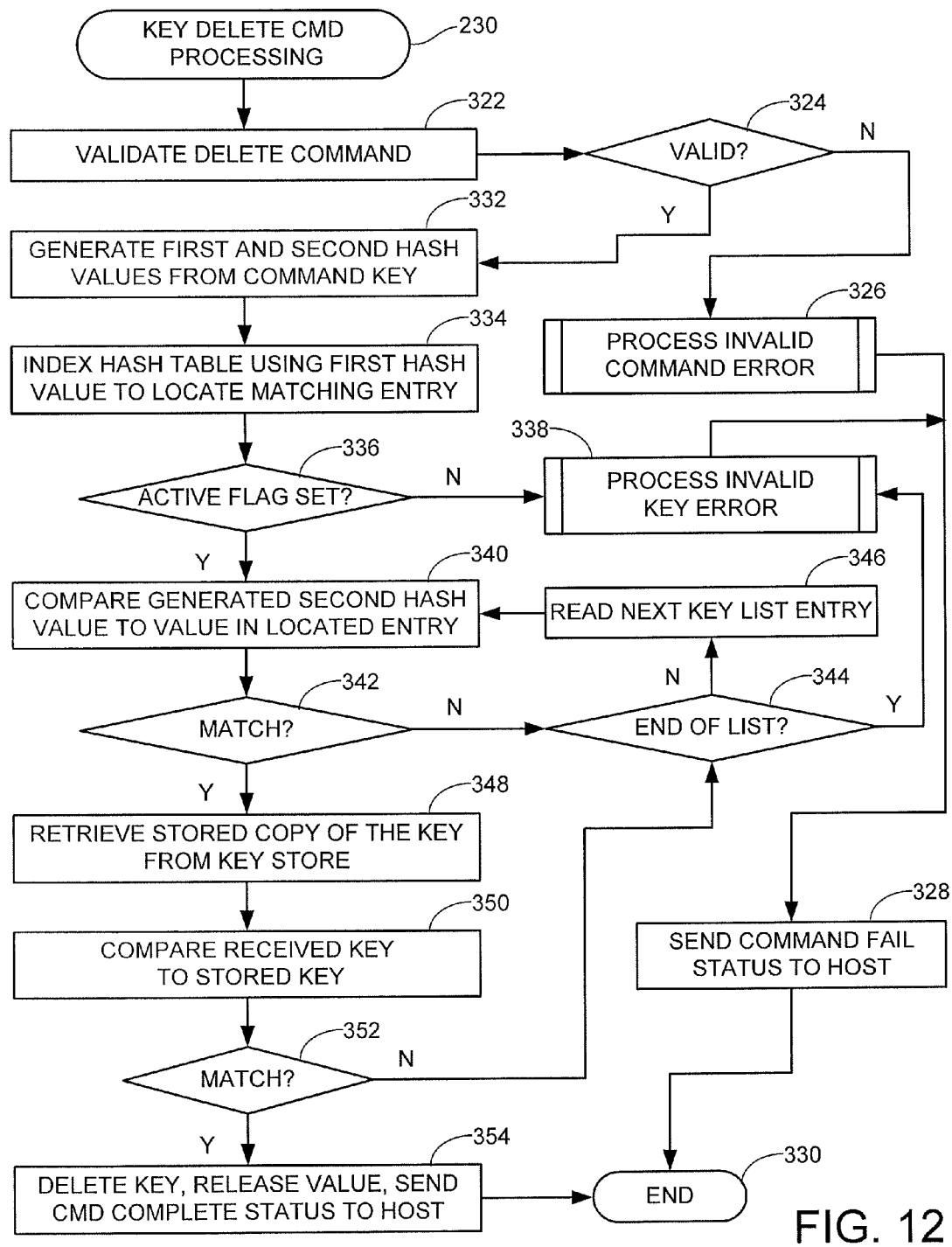
FIG. 12 is a flow chart for a key delete command processing routine.

FIG. 12 shows a flow chart for the key delete command processing routine 230. As before, the routine 230 is merely exemplary and is not limiting. The routine 230 processes a special type of command that is carried out to delete (remove) keys from the key linked list and to release data from the main memory store (e.g., rotatable memory 122). The routine may form a portion of a secure erasure type operation where data are securely purged or otherwise removed from the system.

It will be noted that the routine 230 generally has the same overall flow as the read command processing of routine 210 in FIG. 10, and so a detailed discussion is not necessary for a full understanding thereof.

Generally, command validation occurs at step 322, with invalid commands processed via steps 324, 326, 328 and 330. First and second hash values are generated based on the input key at step 332. The first hash value is used to index the hash table 144 with a view toward locating and matching the second hash value (steps 334, 336, 338, 340, 342, 344, 346).

Upon a match of the second hash value, the location of the corresponding key within the key store 136 is known. The key is retrieved from this known location and compared to the input key (steps 348, 350, 352). Upon a match of the respective keys, the associated key is deleted from the key store, the associated value is deleted from the value store, the corresponding key entry is deleted from the key linked list and a command complete status is forwarded to the host (step 354).

While not specifically shown in FIG. 12, other corresponding steps may be carried out as well. An active flag status of inactive may be supplied to the hash table 132, and an inactive status may be similarly supplied to the storage tables 142. Operations may take place upon the value store 138 such as a secure erasure of the associated data block(s) from the main memory. Secure erasures may be carried out, such as by the successive overwriting and erasure of the memory locations that store the data associated with the deleted key.

The embodiments discussed thus far for the exemplary hybrid data storage device 110 have contemplated the storage of the keys (key store 136) in erasable non-volatile flash memory 120 and the storage of the associated data blocks (value store 138) in rewritable non-volatile rotatable memory 122. Additional aspects of these types of memories will now be briefly discussed.

Figure 13:
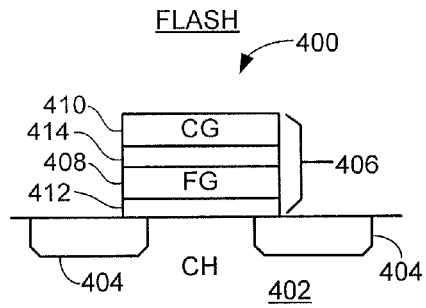
FIG. 13 is a schematic depiction of a flash memory cell to illustrate an exemplary form of non-volatile memory module for the device of FIG. 1.

An exemplary NAND flash memory cell 400 is shown in FIG. 13. The memory cell 400 is formed on a semiconductor substrate 402 having spaced apart n+ doped regions 404. A gate structure 406 spans the pair of adjacent doped regions so that the flash cell 400 takes a general nMOS transistor configuration. A series of adjacent flash cells can be formed in a NAND configuration with a different gate structure 406 spanning each adjacent pair of the doped regions 404.

Each gate structure 406 provides an alternating stack of electrically conductive gates 408, 410 and electrically insulative regions 410, 412. Data are stored by each cell 400 in relation to the relative amount of electrical charge stored on the lower gate 408, which is characterized as a floating gate (FG).

In an initial erased state, there will be substantially no accumulated charge on the FG 408. In this state, the cell will exhibit drain-source conductivity across the channel CH without the application of voltage to the CG 410. Once charge has been accumulated on the FG 408, the drain-source path will be non-conductive unless a sufficiently high gate control voltage is applied to the CG 410, at which point the cell becomes conductive. The programmed state of the cell 400 can thus be determined by observing the level of CG voltage required to allow drain-source current to pass through the cell, which generally correlates to the amount of accumulated charge on the FG 114. A specially configured erasure operation is carried out to migrate the charge back to the channel and return the cells 400 to an erased state.

It will be noted that using the flash memory cells 400 as the key store 136 means that, generally, the key values may not change over time, nor will be key values be moved to different locations. Nevertheless, it may be necessary to monitor the performance of the key store 136 to ensure that charge drift, adjacent writes, data aging, etc., do not degrade the ability of the flash I/F 116 (FIG. 2) from reliably recovering the key values. From time to time it may be necessary to schedule and perform a background refresh operation in which the data are read, an erasure operation is applied to the cells, and the data are rewritten to the cells. Migrations of the keys to new locations within the flash memory array should be reflected in the hash table 132.

A destructive secure erasure of the data storage device can be carried out in a number of ways. One approach involves erasing the key values in the key store 136. The data structures that form the hash table 132, key linked list 140 and the tracking tables 142 can be stored in the flash memory cells 400 and loaded to the local memory 124 upon system initialization. Thus, another destructive secure erasure approach can involve destruction of the non-volatile copies of these data structures.

Non-destructive secure erasure of the data storage device can be carried out such as by destroying the key linked list 140 (FIG. 5) and resetting the active status flags 148 to inactive for all entries 144 in the hash table 132 (FIG. 4). In this latter case, the device remains operable to store new data.

Figure 14:
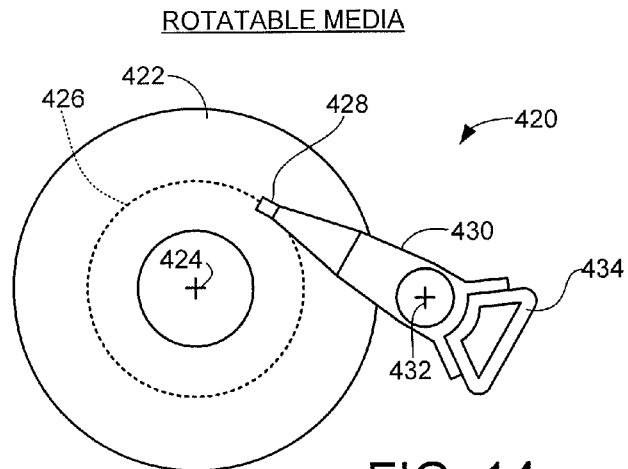
FIG. 14 is a schematic depiction of a rotatable media (HDD) module to illustrate an exemplary form of non-volatile memory module for the device of FIG. 1.

FIG. 14 is a schematic depiction of rotatable memory 420 in the form of one or more rotatable magnetic recording media (discs) 422. The discs 422 are rotated at high speed using a spindle motor (not shown) about a central rotational axis 424. Concentric data tracks such as 426 are defined on the data recording surfaces and accessed by a corresponding array of data read/write transducers 428. The data transducers are supported at one end of an actuator assembly 430 that pivots about a second axis 432. A voice coil 434 of a voice coil motor (VCM) can be used to pivot the actuator assembly 430 to align the transducers with the tracks.

Generally, rotatable media such as 422 will tend to have a lower access rate as compared to the flash memory cells 400 of FIG. 13. A hybrid arrangement as in FIG. 2 in which the main value store 138 is maintained on the rotatable media 422 and the key store 136 is maintained in faster solid-state memory provides a number of performance benefits. However, such is not necessarily limiting in that, as desired, the key store 136 and the value store 138, or portions thereof, can be maintained on the rotatable media 422. The key store can be accessed directly from the media each time an input command is provided to the device, or the key store (or relevant portions thereof) can be transferred to a faster local memory (including DRAM) during operation.

Figure 15:
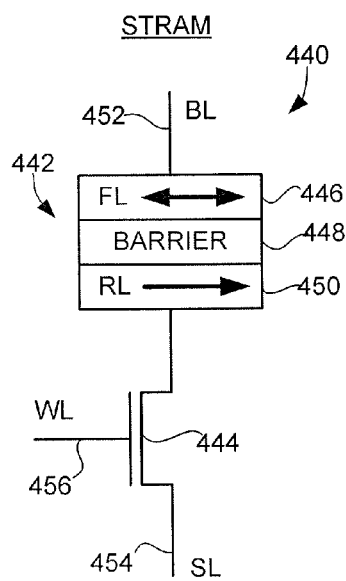
FIG. 15 is a schematic depiction of a spin torque transfer random access memory (STRAM) cell to illustrate an exemplary form of non-volatile memory module for the device of FIG. 1.

FIG. 15 is a schematic representation of a spin-torque transfer random access memory (STRAM) cell 440 in accordance with some embodiments. The STRAM cell 440 can be incorporated into a memory module such as 104 in FIG. 1 and used as a memory module for the storage of the key store 136 and/or the value store 138. The STRAM cell 440 is a solid-state semiconductor non-volatile memory in which a programmed value is stored in a resistive sense element (RSE) 442 connected in series with a switching device 444. The RSE 442 is characterized as a magnetic tunneling junction (MTJ) and the switching device 444 is characterized as an n-channel metal oxide semiconductor field effect transistor (nMOSFET).

The MTJ 442 includes a free layer 446, a barrier layer 448 and a reference layer 450. Additional layers can be provided. The free layer (FL) 446 has a variable magnetic orientation, the reference layer (RL) 450 has a fixed magnetic orientation and the barrier layer 448 induces spin torque during programming operations to switch the orientation of the free layer. Generally, the MTJ 442 will exhibit different electrical resistances based on the orientation of the free layer 446 (e.g., parallel or antiparallel to the reference layer 450).

Each cell uses three reference lines including a bit line (BL) 452, a source line (SL) 454 and a word line (WL) 456. Other arrangements can be used including cross-point arrays with just two control lines (a bit line and a source line) connected to each cell. Generally, the programming state of the STRAM cell 440 is established by passing a write current in a selected direction through the cell to process the magnetization of the free layer 442 to a desired state. The programmed state can thereafter be sensed by sensing the overall electrical resistance of the STRAM cell 440.

A feature of the STRAM cell 440 is that the cell is rewritable without the need to perform a separate erasure operation, as with the flash memory cells 400 of FIG. 13. A memory module formed of STRAM cells 440 could thus be adapted for storage of the key store 136 and/or the value store 138, or portions thereof, and allow existing data values or control (metadata) values to be overwritten with new values in the same locations. Additionally, a memory module formed of STRAM cells 440 could provide non-volatile storage of the various key linked lists and storage tables used in the DRAM local memory 124 discussed above.

Figure 16:
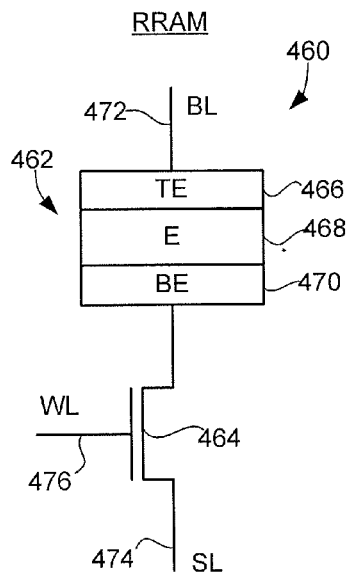
FIG. 16 is a schematic depiction of a resistive random access memory (RRAM) cell to illustrate an exemplary form of non-volatile memory module for the device of FIG. 1.

FIG. 16 is a schematic representation of a resistive random access memory (RRAM) cell 460 in accordance with some embodiments. As before, the RRAM cell 460 includes a resistive sense element (RSE) 462 and a switching device 464 (which may be an nMOSFET). The RSE 462 is an RRAM element having a conductive top electrode (TE) 466, an intervening electrolytic layer 468, and a conductive bottom electrode (BE) 470. The RRAM cell 460 is accessed by a bit line (BL) 472, a source line (SL) 474 and a word line (WL) 476.

During programming, ion migration into the electrolytic layer 468 from the electrode layers 466 and 470 (or vice versa) will alter the overall electrical resistance of the RRAM element 462. In some cases, such ion migration may result in the formation of conductive filaments through the electrolytic layer, although such is not necessarily required. The programming state of the RRAM cell 460 can be detected by sensing the programmed resistance of the cell. As with the STRAM cell 440 in FIG. 15, the RRAM cell 460 is rewritable and suitable for use in storing the key store, value store, key linked list and/or storage tables.

Figure 17:
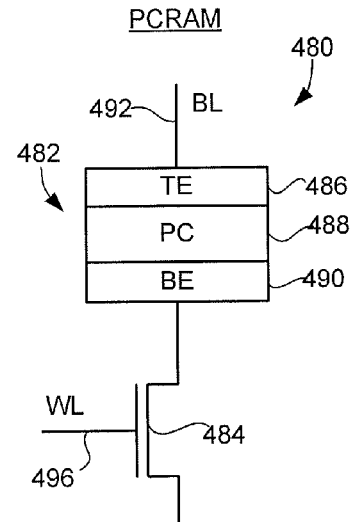
FIG. 17 is a schematic depiction of a phase change random access memory (PCRAM) cell to illustrate an exemplary form of non-volatile memory module for the device of FIG. 1.

FIG. 17 shows a phase change random access memory (PCRAM) cell 480 in accordance with some embodiments. As before, the PCRAM cell 480 includes a resistive sense element (RSE) 482 and a switching device 484 (which may be an nMOSFET). The RSE 482 is a phase change element with a conductive top electrode (TE) 486, a layer of phase change material 488 and a conductive bottom electrode (BE) 490. The RSE 482 and switching device 484 are interconnected using a bit line (BL) 492, a source line (SL) 494 and a word line (WL) 496.

During operation, the phase change layer 488 exhibits different electrical resistances based on crystalline orientation. For example, heating the layer 488 and allowing it to cool slowly may enable the material to attain a first crystallographic orientation (e.g., a crystalline orientation) with a first electrical resistance, and causing the heated layer 488 to cool more quickly may impart a different, second crystallographic orientation (e.g., an amorphous orientation) with a different, second electrical resistance.

Accordingly, a memory module may be formed of PCRAM memory cells such as 480 and used as a key store 136 and/or a value store 138.

It will now be understood that the various embodiments disclosed herein can provide a number of benefits. Using a multi-level hash verification approach can provide fast reject processing to avoid required accesses to a key store in a non-volatile memory to verify that a given input key is associated with particular data, while ensuring data collisions do not result in lost reads or writes. The various embodiments improve data throughput, increase data security and reliability, reduce wear, and ensure fast and reliable data transfers in a key value storage device scheme.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method of accessing data in a key value storage device, comprising:
   storing keys in a key store in a first non-volatile memory and corresponding values associated with the keys in a value store of a second non-volatile memory;
   receiving an input command from a host device, the command having a key associated with a value;
   generating different first and second hash values by applying a hash function to the key received as a portion of the input command;
   using the first hash value as an index into a hash table, the hash table stored in a local memory and comprising a plurality of entries each corresponding to a different first hash value;
   identifying a selected entry in the hash table corresponding to the first hash value, the selected entry in the hash table comprising a copy of the second hash value;
   comparing the copy of the second hash value in the selected entry to the second hash value obtained during the generating step;
   retrieving a copy of the key from the first non-volatile memory at a selected address identified by the selected entry responsive to a match between the copy of the second hash value in the selected entry to the second hash value obtained during the generating step; and
   executing the input command responsive to a match between the key and the copy of the key retrieved from the first non-volatile memory.

2. The method of claim 1, wherein the command is a read command and execution thereof causes a read circuit to retrieve a user data set associated with the key from the second non-volatile memory.

3. The method of claim 1, wherein the generating step comprises applying a cryptographic hash function to the key to generate the first hash value, modifying the key to form a modified key, and applying the cryptographic hash function to the modified key to generate the second hash value.

4. The method of claim 1, wherein the hash function is a first cryptographic hash function, and the generating step comprises applying the first cryptographic hash function to the key to generate the first hash value, and applying a different, second cryptographic hash function to the key to generate the second hash value.

5. The method of claim 1, wherein the first hash value is a first length, and the second hash value is a different, second length.

6. The method of claim 1, wherein the command is a write command and execution thereof causes a write circuit to write a user data set associated with the key to the second non-volatile memory hash table comprises a linked list with a forward pointer.

7. The method of claim 1, wherein the first non-volatile memory is a flash memory and the second non-volatile memory is a rotatable magnetic recording disc.

8. The method of claim 1, wherein the selected entry further comprises a status value indicative of a status of the value identified by the input command.

9. The method of claim 1, wherein the command is a selected one of a read command to return one or more data blocks stored in the value store of the second non-volatile memory module to the host device, a write command to write one or more data blocks to the value store of the second non-volatile memory module, or a key delete command to remove data associated with one or more keys from the storage device.

10. A key-value storage device comprising:
    a first non-volatile memory which stores a key store of copies of key-values available for use in identifying data stored by the storage device;
    a second non-volatile memory module which stores a value store, the value store comprising a plurality of data blocks, each data block storing a fixed amount of user data, the key store providing a unique key-value for each of the data blocks in the value store;
    a local memory which stores a hash table comprising a plurality of entries, each entry corresponding to a different one of the key-values and comprising copies of different first and second hashes of the associated key-value; and
    a command processing circuit configured to receive an input command to transfer data between the storage device and a host device, the input command having a selected key-value, the command processing circuit further configured to generate different first and second hash values by applying at least one hash function to the key-value, to use the first hash value as an index into the hash table to locate a selected entry, to retrieve the copy of the second hash value stored in the selected entry and to compare said copy of the second hash value to the second hash value generated by the command processing circuit, to retrieve a selected copy of a key-value from the first non-volatile memory responsive to a match between said copy of the second hash value and the second hash value generated by the command processing circuit, to compare the selected copy of the key-value to the key value associated with the input command, and to execute the input command responsive to a match between the selected copy of the key-value and the key value associated with the input command.

11. The storage device of claim 10, the first non-volatile memory module comprising solid-state non-volatile semiconductor memory and the second non-volatile memory module comprising rotatable non-volatile magnetic recording media.

12. The storage device of claim 10, wherein the first hash value is a first length, and the second hash value is a longer, second length.

13. The storage device of claim 10, wherein the input command is a write command and execution thereof causes the storage device to write a user data set associated with the key-value to the second non-volatile memory.

14. The storage device of claim 10, wherein the input command is a read command and execution thereof causes the storage device to retrieve a user data set associated with the key-value from the second non-volatile memory.

15. The storage device of claim 10, wherein the local memory stores plurality of data structures including the hash table, a key linked list and a status table, wherein the first hash value is N-bits in length and the hash table has $2^N$ entries with each entry corresponding to a different value of the first hash value, the key linked list comprises entries linked to the entries in the hash table sharing the same first hash value and different second hash values, and the status table provides status values indicative of a status of values in the respective key store and value store.

16. A key-value storage device comprising:
a first non-volatile memory module which stores a key store;
a second non-volatile memory module which stores a value store comprising a plurality of data blocks each storing an amount of user data, the key store comprising a plurality of keys and physical addresses of the data blocks in the value store associated with the keys;
a host interface module adapted to receive an input command from a host device coupled to the key value storage device, the input command having an associated key;
a hash function module adapted to generate different first and second hash values by applying a cryptographic hash function to the associated key;
a local memory module which stores a hash table and a key linked list, the hash table comprising a plurality of entries each comprising to a different possible value of the first hash value and a corresponding possible value of the second hash value, the key linked list comprising a plurality of entries linked to the entries of the hash table and having additional possible values of the second hash value; and
a control circuit adapted to use the first hash value generated by the hash function module to index the hash table to locate a first matching entry, to evaluate the located matching entry and one or more of the key linked list entries to locate a second matching entry that matches the second hash value generated by the hash function module, to access the key store and retrieve a copy of the associated key from a location identified by the second matching entry, to compare the retrieved copy of the associated key and the received associated key from the received command, and to execute the input command to transfer data between the key value storage device and the host device responsive to a match between the retrieved copy of the associated key and the received associated key from the received command.

17. The storage device of claim 16, wherein the local memory comprises a volatile memory module to which the hash table and the key linked list are loaded from a non-volatile memory location during initialization of the key value storage device.

18. The storage device of claim 16, wherein the first memory module comprises solid-state non-volatile memory cells comprising at least a selected one of flash memory cells, spin-torque transfer random access memory (STRAM) cells, resistive random access memory (RRAM) cells or phase change random access memory (PCRAM) cells.

19. The storage device of claim 16, wherein the first non-volatile memory is a flash memory and the second non-volatile memory is a rotatable magnetic recording disc.

20. The storage device of claim 16, wherein the first hash value has a first total number of bits, and the second hash value has a second total number of bits greater than the first total number of bits.

* * * * *